United States Patent [19]
de la Soujeole

[11] Patent Number: 6,118,602
[45] Date of Patent: Sep. 12, 2000

[54] PREAMPLIFIER FOR A READ/WRITE HEAD

[75] Inventor: Axel Alegre de la Soujeole, Scotts Valley, Calif.

[73] Assignee: STMicroelectronics, Inc., Carrollton, Tex.

[21] Appl. No.: 08/962,067

[22] Filed: Oct. 31, 1997

[51] Int. Cl.[7] .................................................. G11B 5/09
[52] U.S. Cl. ................... 360/46; 360/67; 360/68; 360/66; 360/63; 360/53; 360/128; 360/108
[58] Field of Search ................. 360/67, 68, 46, 360/66, 63, 53, 31, 128, 108, 104, 137

[56] References Cited

U.S. PATENT DOCUMENTS

| | | | |
|---|---|---|---|
| 5,430,584 | 7/1995 | Petersen | 360/78.04 |
| 5,452,151 | 9/1995 | Money et al. | 360/75 |
| 5,552,950 | 9/1996 | Coffey et al. | 360/128 |
| 5,754,369 | 5/1998 | Balakrishnan | 360/104 |
| 5,801,896 | 9/1998 | Freitas | 360/77.02 X |
| 5,859,746 | 1/1999 | Ishida et al. | 360/104 X |
| 5,977,817 | 11/1999 | Soujeole | 327/538 |

*Primary Examiner*—Alan T. Faber
*Attorney, Agent, or Firm*—David V. Carlson; Theodore E. Galanthay; Lisa K. Jorgenson

[57] ABSTRACT

A multi-head, disc drive, of a data storage system having a preamplifier that is split into a mother chip and set of daughter chips, each daughter chip corresponding to a head in the disc drive. The daughter chips contain very little circuitry, typically just a write driver, the front end of a read amplifier, a write fault detector, and a bias control circuit. Because the daughter chip contains little circuitry, it can be made much smaller and lighter than a conventional preamplifier, allowing the daughter chip to be placed on the suspension, close to the head. This allows the signal sent to and received from the head associated with a daughter chip to be strong enough not to be corrupted during transmission to the circuitry in the rest of the preamplifier. It also increases the bandwidth and reduces the power consumption of the preamplifier. The mother chip contains the remaining circuitry needed in the preamplifier and can be placed farther away, on a portion of the HSA that can support a larger chip.

47 Claims, 6 Drawing Sheets

PREAMPLIFIER FOR A READ/WRITE HEAD

CROSS-REFERENCE TO RELATED APPLICATIONS

This application contains some text and drawings in common with pending U.S. patent applications entitled: "A Current Biased Mode Control Circuit" by Axel Alegre de la Soujeole Ser. No. 08/961,905, (Attorney Docket Number 97-087), and has the same effective filing date and ownership as the present application, now U.S. Pat. No. 5,977,817, and to that extent is related to the present application, which is incorporated herein by reference.

BACKGROUND

The present invention relates to a preamplifier for a read and/or write head, and is more specifically related to an improved preamplifier for a magneto-resistive (MR) head for read and/or write operations.

Heads for reading and writing information are used in data storage systems, such as disc drives. Many data storage systems are designed for both the recording and the retrieval of data, and therefore require both a write and a read head. For example, conventional disc drives are used to both record and retrieve information. Typically, one head, a read/write head, is used for both the recording and the retrieval of data. The head is mounted on a head stack assembly (HSA), which typically includes a voice coil motor, an arm assembly, heads, a preamplifier, and a flexible circuit ("flex circuit") and flexible circuit board ("flex circuit board") that connects the heads, preamplifier, and printed circuit board together.

Figure 1:
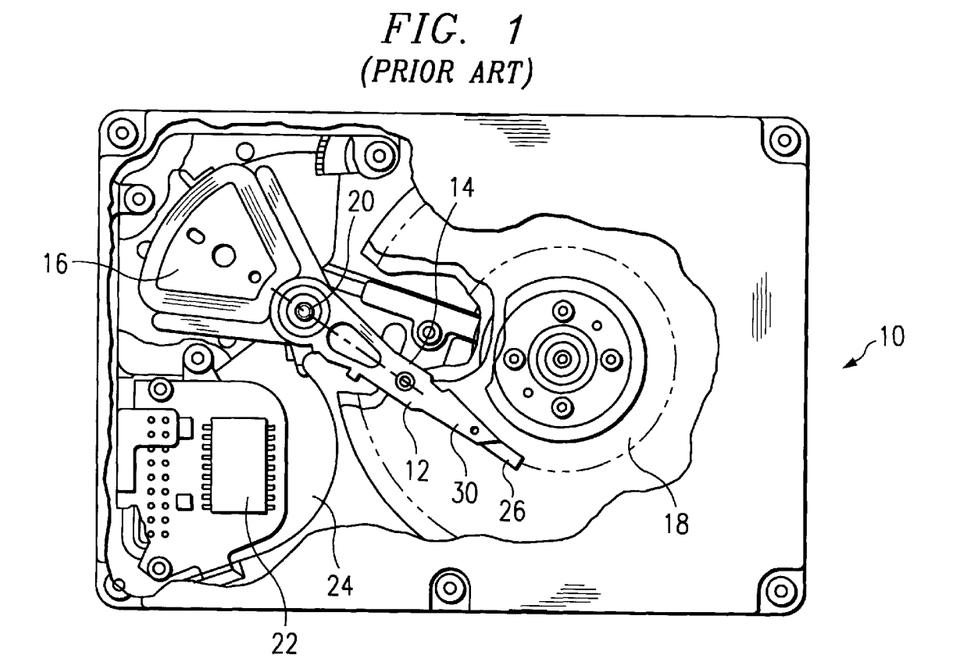
FIG. 1 is a perspective view of a conventional disc drive having a coil head and a preamplifier.

FIG. 1 is a perspective view of a conventional information storage system 10, hereinafter disc drive 10, having one or more heads 26 including a coil transducer, hereinafter coil head 26. The disc drive includes actuator arms 14 driven by a voice coil motor 16. The actuator arms 14 extend from a pivot assembly 20, located at one end of the voice coil motor 16, and over the discs 18 to position the coil head 26 over the selected track of one of the discs 18. The voice coil motor 16 responds to signals received at extension pins to provide the force necessary to rotate the actuator arms 14 about the pivot 20 to position the coil head 26 over a desired track on the rotating disc 18.

Figure 3:
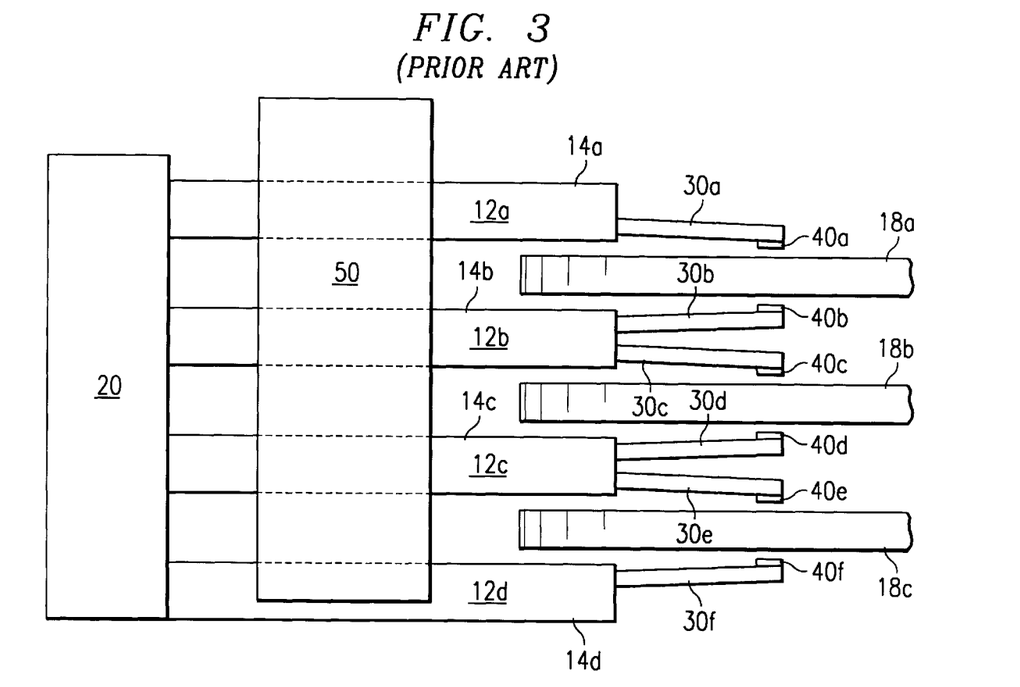
FIG. 3 is a schematic representation of a side view of a portion of the conventional disc drive in FIG. 2.

Each actuator arm 14 includes a substantially triangular shape rigid arm 12 and either one or two suspensions 30 supported by the rigid arm 12. The rigid arm 12 is mounted at the pivot 20 around which the actuator arm 14 rotates. The head 26 is mounted at the opposite end of the suspension 30 from the connection to the rigid arm 12. Referring to FIG. 3, each actuator arm 14 can support two suspensions 30, each supporting a head. One suspension 30b is for writing data to and reading data from the disc 18a above the actuator arm 14b, and the other suspension 30c is for writing data to and reading data from the disc 18b below the actuator arm 14c. The top and bottom actuator arms 14a, 14d only need one suspension, designated 30a and 30f, respectively.

Referring again to FIG. 1, each of the coil heads 26 reads data from and writes data to selected tracks on the surface of the disc 18. The position of the heads 26 is determined by the voice coil motor 16 which responds to electrical signals from a controller (not shown) supplied through a preamplifier 22. Only one head can read or write data at a time. The preamplifier contains a MUX and DEMUX circuits to select which of the heads is operating. The data read from the tracks on the disc 18 is also transferred through the preamplifier 22. The preamplifier amplifies the signals and transfers them to external circuitry. The preamplifier is connected by a flex circuit 24 to each of the actuator arms 14. Typically, only one preamplifier is used, however, if there is a large disc stack several preamplifiers can be used, with each preamplifier connected to only some of the actuator arms. In disc drives 10 where the head 26 contains a coil transducer, the preamplifier 22 is typically located on a base board adjacent to the actuator arm 14, as in FIG. 1, which places it typically 3½ to 4 inches away from the head 26 in a 3½ disc drive.

Figure 2:
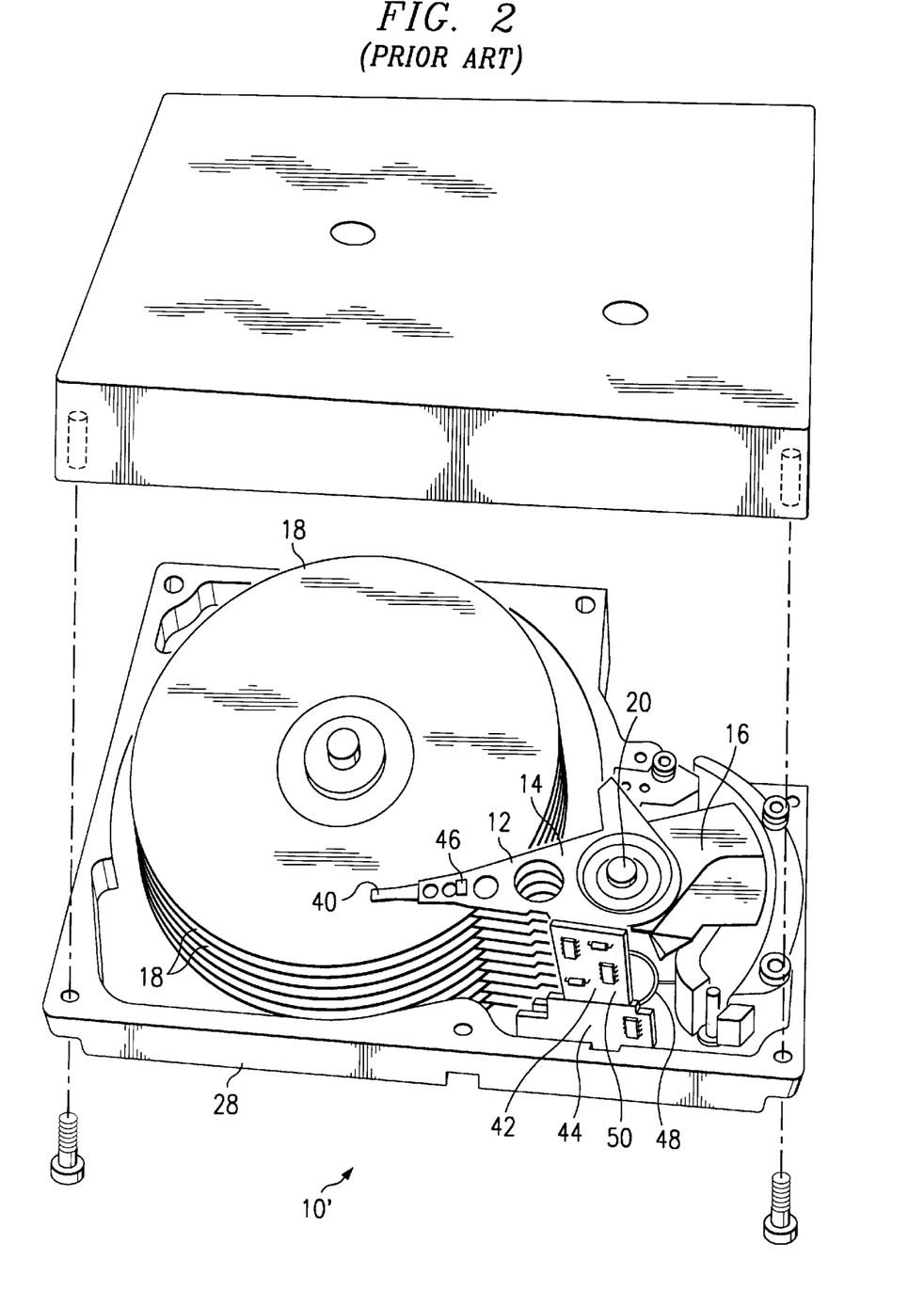
FIG. 2 is an exploded perspective view of a conventional disc drive having an MR head and a preamplifier.

Magneto-resistive (MR) heads have become popular in disc drives because they allow for an increase in the density with which data can be stored on the disc and they allow an optimization of the read and write operations. FIG. 2, shows a conventional disc drive 10' having a head 40 including an MR transducer, hereinafter an MR head 40. Disc drive 10' again includes a plurality of actuator arms 14 that extend over the disc 18 from a pivot assembly 20, located at one end of a voice coil motor 16. The actuator arms 14 are driven by the voice coil motor 16 to position the MR head 40 over the selected track of the disc 18. The voice coil motor 16 responds to signals received at extension pins to provide the force necessary to rotate the actuator arms 14 about the pivot 20 to position the MR head 40 over a desired track on the rotating disc 18. The position of the MR head 40 is determined by the voice coil motor 16 which responds to electrical signals from a controller (not shown) supplied through a preamplifier 50. Only one of the heads operates at a time. The preamplifier 50 contains a MUX and DEMUX circuits to select which of the heads is operating. The data read from the tracks on the disc 18 is also transferred through the preamplifier 50 where the signal containing the data is amplified and is transferred to external circuitry.

Each actuator arm 14 includes a substantially triangular shaped rigid arm 12 and a suspension 30 supported by the rigid arm 12. The rigid arm 12 is mounted at the pivot 20 around which the actuator arm 14 rotates. The MR head 40 is mounted at the opposite end of the suspension 30 from the connection to the rigid arm 12. Again, each actuator arm 14 can support two suspensions 30, one for the disc above the actuator arm 14 and the other for the disc below the actuator arm 14. The top and bottom actuator arms 14 only need one suspension 30. Also mounted on the actuator arms 14 is a flex circuit board 42, which is connected by a flex circuit 48 to a base circuit board 44.

Figure 4:
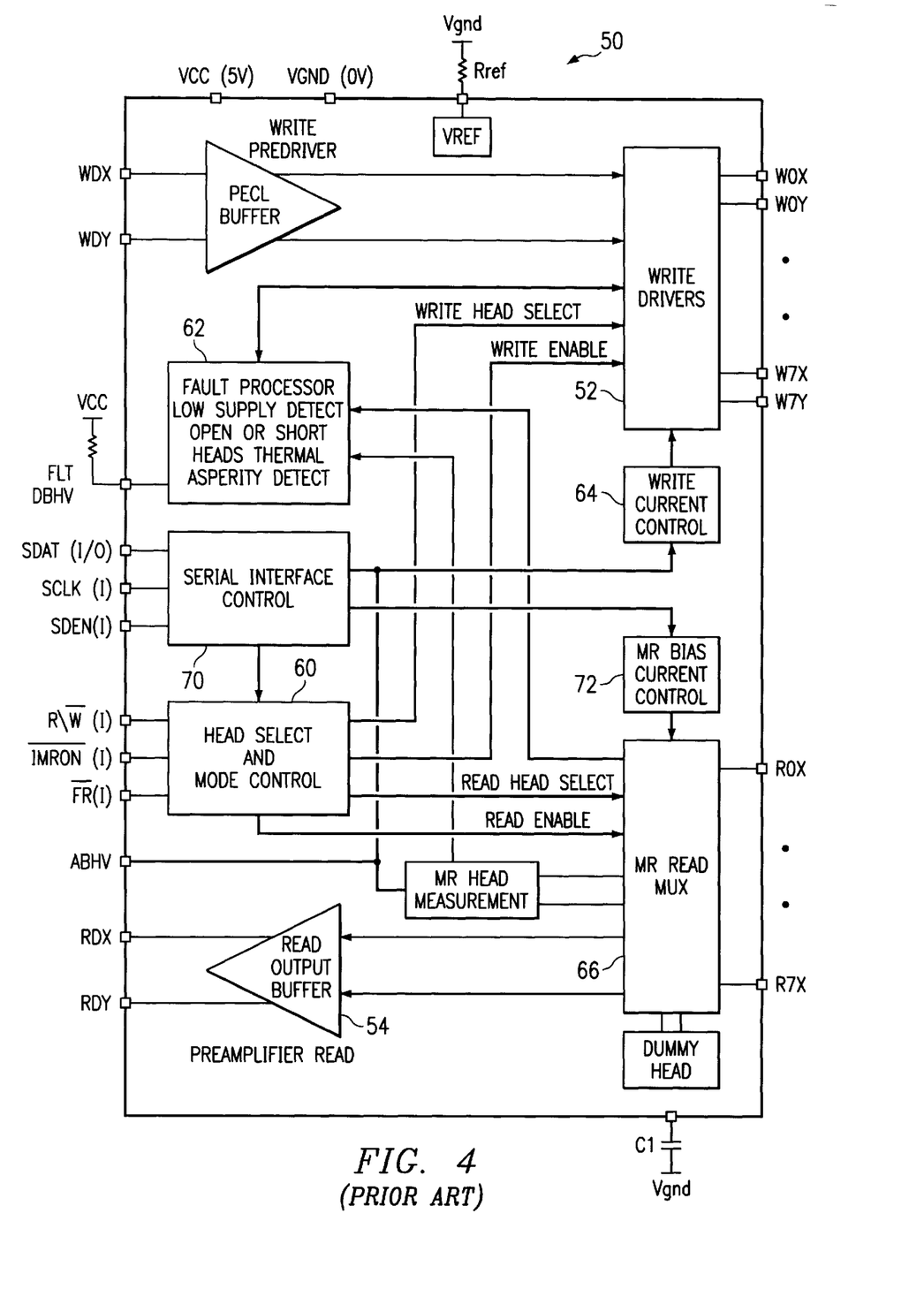
FIG. 4 is a block diagram of a conventional preamplifier.

FIG. 4 is a block diagram of a conventional preamplifier 50. The preamplifier 50 contains write drivers 52 and a read amplifier 54 (a read output buffer). The preamplifier 50 also typically contains logic 60, such as the head select and mode control circuit 60 that controls the operation of the preamplifier 50, a fault detection circuit 62 that contains write and read fault detection circuitry, a MUX 66 and DEMUX (not shown), a serial interface control 70, write 64 and read bias 72 circuits, a bandgap circuit (not shown), a voltage detection circuit (not shown), circuits to obtain thermal and current measurements of the MR transducer (now shown), and several D/A converters that are shown as parts of the other blocks. The preamplifier 50 may also include various other circuitry (not shown).

Referring again to FIG. 2, the signal line impedance between the transducer of the MR head 40 and the preamplifier 50 is critical when using low impedance preamplifiers 50. The signal line impedance if the preamplifier 50 was placed on the baseboard adjacent to the actuator arm 14 would result in a significant reduction in bandwidth for a low impedance preamplifier 50. Additionally, the attenuation of the signal if the preamplifier 50 was placed on a base board adjacent to the actuator arm 14 could result in a loss or corruption of data. Placing the preamplifier as close to the heads as possible reduces the inductance between the head and the preamplifier, since the length of the wire is shorter. Reducing the inductance allows for an increase in frequency, producing an increase in the bandwidth, during a write operation, thus increasing the maximum data rate and capacity. It also reduces the power consumption during a write operation.

The preamplifier 50 should be mounted as close as possible to the MR head 40 so that the preamplifier 50 can receive a strong signal from the head 40. However, for other reasons, such as the size of the preamplifier and cost of mounting, it may be desirable to mount the preamplifier 50 elsewhere. The preamplifier 50 can be mounted in one of three places. It may be bonded directly to the top rigid arm 12 in a position similar to location 46. It may be positioned on the flex circuit board 42, which is attached to actuator arm 14. Finally, it may be mounted to base circuit board 44, which is attached to the base casting 28 of disc drive 10'. When the preamplifier 50 is mounted to the top rigid arm 12 it is farther from the head 40 of the bottom actuator arm 14 than if the preamplifier 50 is mounted on the flex circuit board 42.

Referring to FIGS. 2 and 3 simultaneously, in an MR head, it is preferable to mount the preamplifier 50 to the flex circuit board 42. For a 3½" disc drive, the signal run length from the MR transducer to the preamplifier 50 on the flex circuit board 42 is about 1½" to 1¾", saving about 2 inches over placement of the preamplifier circuit on the baseboard adjacent to the HSA.

The preamplifier is mounted on the flex circuit board 42 or the top rigid arm 12 because that is the closest that the preamplifier 50 can be mounted to the MR head 40. However, due to the signal bandwidth reduction of the MR heads, it is desirable to move the preamplifier closer to the MR heads.

SUMMARY OF THE INVENTION

A preamplifier in accordance with the present invention includes a daughter chip and a mother chip. The daughter chip is coupled to a head and is mounted on a suspension of an actuator arm. The daughter chip amplifies the signal read by the head. The mother chip is coupled to the daughter chip and controls the operation of the daughter chip and also further amplifies the signal read by the head.

The novel features believed characteristic of the invention are set forth in the appended claims. The nature of the invention, however, as well as its features and advantages, may be understood more fully upon consideration of illustrative embodiments when read in conjunction with the accompanying drawings, wherein:

BRIEF DESCRIPTION OF THE DRAWINGS

Parts common to FIGS. 1 through 7 are indicated using the same numbering system.

DETAILED DESCRIPTION OF THE PREFERRED EMBODIMENT

Figure 5:
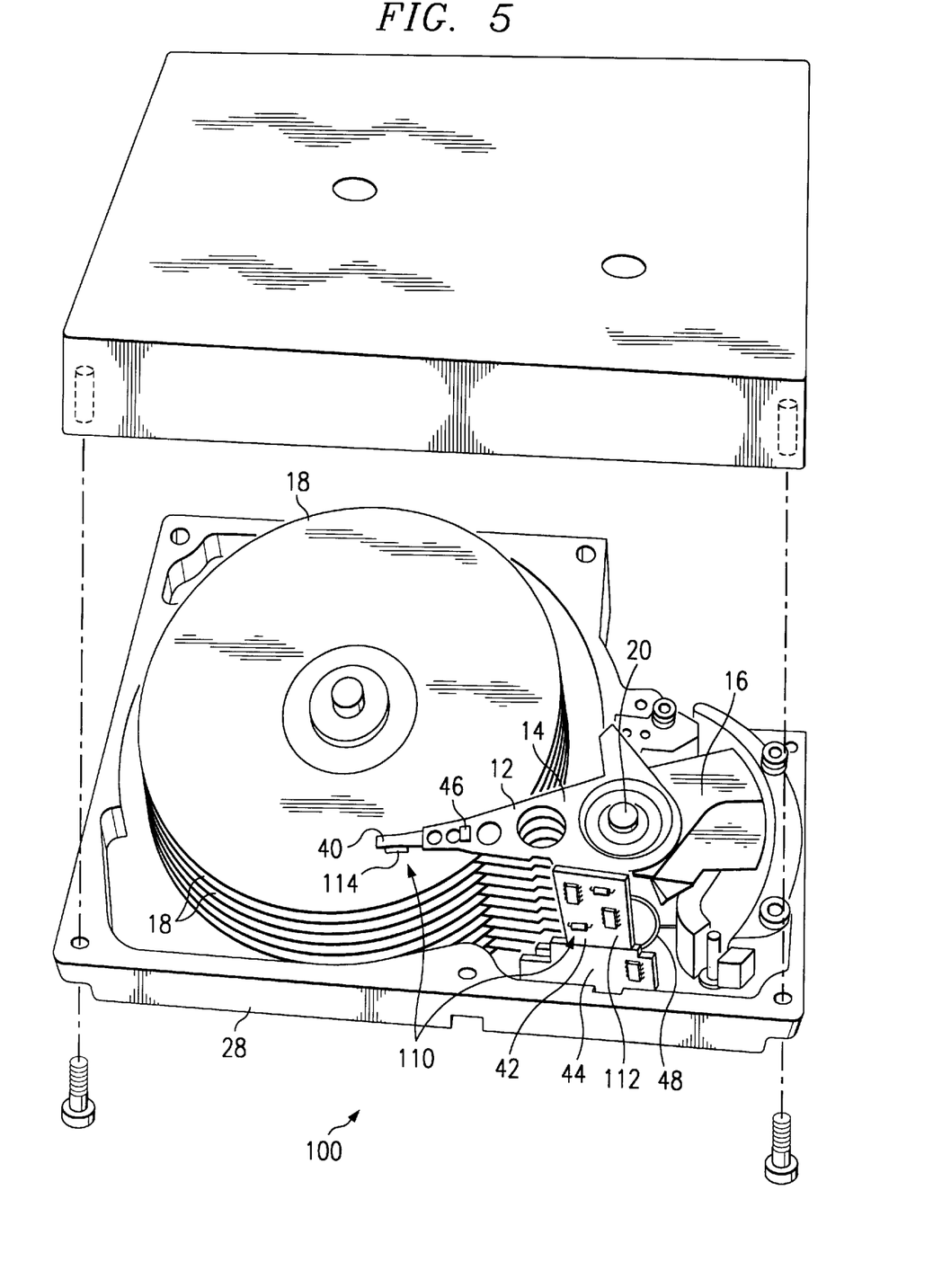
FIG. 5 is an exploded perspective view of a disc drive according to the present invention.

Referring to FIG. 5, a preamplifier according to an embodiment of the invention is designated generally by reference numeral 110. The preamplifier 110 is typically included in a data storage system 100, such as a disk drive, hereinafter disc drive 100.

Disc drive 100 includes a head 40 that has an MR transducer, hereinafter head 40. Although the preamplifier of the present invention is most advantageous for MR heads, it can be used with any head. The head is a read/write head. In alternate embodiments, the head can include only read or only write circuitry, in the preferred embodiment it includes both.

The disc drive 100 also includes a plurality of actuator arms 14 that extend over the discs 18 from a pivot assembly 20, located at one end of a voice coil motor 16. The actuator arms 14 are driven by the voice coil motor 16 to position the head 40 that is on the actuator arm 14 over the selected track of disc 18. The voice coil motor 16 responds to signals received at extension pins to provide the force necessary to rotate the actuator arms 14 about the pivot 20 to position the head 40 over a desired track on the rotating disc 18. The position of the head 40 is determined by the voice coil motor 16 which responds to electrical signals from a controller (not shown) supplied through the preamplifier 110. Only one head reads or writes data at one time. The preamplifier 110 contains a MUX and DEMUX circuits to select which of the heads is operating. The data read from the tracks on the disc 18 is also transferred through the preamplifier 110. The preamplifier 110 amplifies the signals and transfers them to external circuitry.

Figure 6:
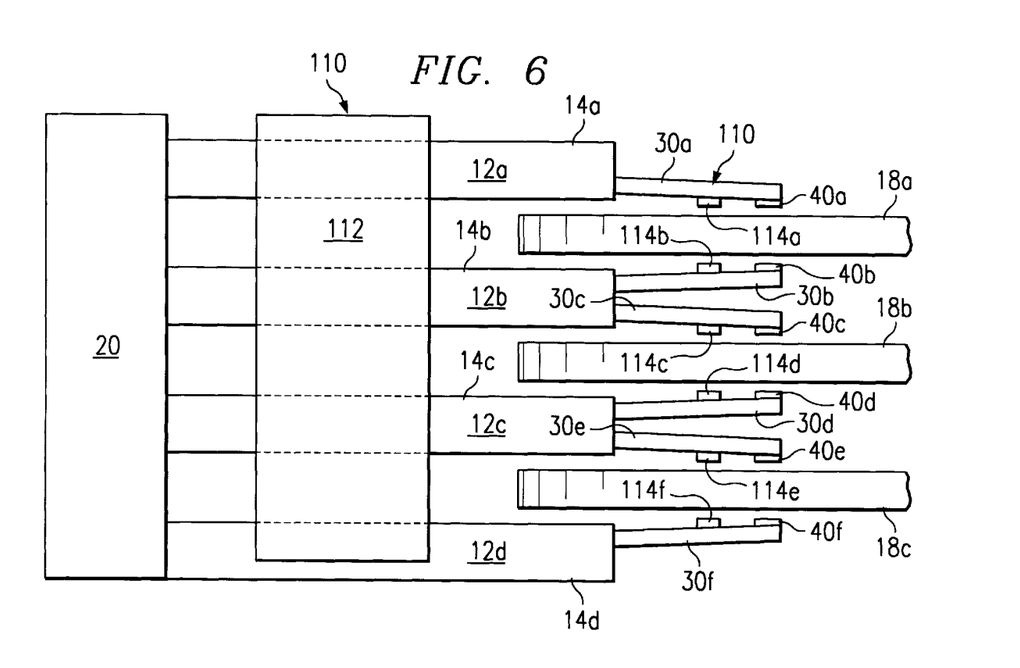
FIG. 6 is a schematic representation of a side view of a portion of a disc drive according to an embodiment of the present invention.

Each actuator arm 14 includes a substantially triangular shaped rigid arm 12 and a suspension 30 supported by the rigid arm 12. The rigid arm 12 is mounted at the pivot 20 around which the actuator arm 14 rotates. The head 40 is mounted at the opposite end of the suspension 30 from the connection to the rigid arm 12. Referring to FIG. 6, as in conventional disc drives, each actuator arm 14 can support two suspensions 30, each supporting a head. One suspension 30b is for writing data to and reading data from the disc above 18a the actuator arm 14b and the other suspension 30c is for writing data to and reading data from the disc 18b below the actuator arm 14b. The top and bottom actuator arms 14a, 14d only need one suspension 30a, 30f. Referring again to FIG. 5, also mounted on the actuator arms 14 is a flex circuit board 42, which is connected by flex circuit 48 to base circuit board 44. The disc drive 100 may also include various other circuitry (not shown).

Referring to FIG. 6, the preamplifier 110 includes a mother chip 112 and a plurality of daughter chips 114a . . . 114f. Each of the daughter chips 114a . . . 114f is mounted on one of the suspensions 30a . . . 30f and connected to the head 40a . . . 40f mounted on that associated suspension 30a . . . 30f. Each daughter chip 114a . . . 114f signals its associated head 40a . . . 40f to write data to disc or to read data from the disc. The daughter chips 114a . . . 114f also amplify the signal read by their associated heads.

Preferably there is one daughter chip 114 for each of the heads 40, and each daughter chip 114a . . . 114f is associated with one head 40a . . . 40f. Although only 3 discs and 6 heads are shown in the figure, the number of discs and head does not need to be limited to 3 and 6 respectively, and is typically more. Since the sizes of the actuator arms 14 are approximately the same in one disc drive, and the sizes of the discs 18 are approximately the same in one disc drive, for ease of reference one actuator arm 14b and one daughter chip 114c will be used to describe the daughter chips.

Preferably, the daughter chip 114c is a flip chip and is mounted by solder bumps to the same side of the suspension 30c as the head 40c. The daughter chip 114c being a flip chip allow it to be thin, because this does not require packaging for the daughter chip 114c, while still protecting it from the environment. However, it is typically through the packaging that heat is dissipated from ICs. To assist with heat dissipation from the daughter chip 114c metal trains, typically copper, are added to the suspension 30c leading from the daughter chip 114c. This will dissipate some of the heat generated by the daughter chip 114c, but typically more heat needs to be dissipated. In the preferred embodiment of the invention the daughter chip 114c is mounted on the same side of the suspension 30c as the head 40c, allowing the daughter chip to face the disc 18b. This permits the daughter chip to be cooled by the airflow from the disc 18b when the disc 18b rotates. Therefore, the location on the daughter chip 114c assists in heat dissipation.

The daughter chip 114c needs to fit into the space between the suspension 30c and the disc 18b without dragging on the disc 18b. This requires the maximum height of the daughter chip 114c to be about the maximum height of the head 40c less the thickness of the material that attaches the daughter chip 114c to the suspension 30c. In current technology, the disc 18b has a height of about 1000μ, and a head 40c, has a height of about 300μ. Therefore, the combined height of the daughter chip 114c and the thickness of the solder bump should be at most any value between about 250μ to 300μ. It is optimal to minimize the thickness of the solder bump. Typically the solder bump is 100μ, preferably the solder bump can be made smaller, to for example 50μ or 30μ, although any thickness of the solder bump that will allow the height of the daughter chip 114c and the thickness of the solder bump to be about or less than the height of the head 40c. The daughter chip 114c can be made 200μ in height. It may be preferable to reduce the size of the daughter chip 114c to 150μ, however any value less than 300μ, such that the height of the daughter chip 114c and the thickness of the solder bump is less than the height of the head 40c will work.

The daughter chip 114c is preferably located at any distance between 3 and 17 millimeters from the head 40c. It is preferable to attach the daughter chip 114c as close to the head as possible, however, the weight and shape of the daughter chip should be taken into account to make sure that the suspension 30c can support the daughter chip 114c in the location it is placed so that the daughter chip does not pull the suspension 30c either too close to the disc 18b so that neither the daughter chip 114c nor the head 40c drags on the chip for suspensions above the disc, or too far from the disc so that the head has trouble reading from or writing to the disc for suspensions below the disc. Additionally, the daughter chip 114c should be placed at a position on the suspension 30c such that it is at a node for the vibration of the suspension 30c, so that the daughter chip 114c does not interfere with the vibration of the suspension 30c. The suspension 30c can be any length between 11 and 35 mm, typical lengths are 11 mm 18 mm and 35 mm. In an MR head, the daughter chip 114c is connected to the head 40c by two sets of wires, one for the read operation and one for the write operation. The wires are fastened to the suspension 30c, such as by welding, or a micro flex circuit can be clipped or bonded to the suspension, however the wires can also be etched into the suspension 30c.

The mother chip 112 is coupled to all of the daughter chips 114a . . . 114f. Typically only one mother chip 112 is needed, however if there are a large number of discs in the disc drive, usually more than six, several mother chips may be used. The mother chip 112 selects which one the daughter chips 114a . . . 114f will signal its associated head 40a . . . 40c to write data to the disc 18a . . . 18c or to read data from the disc. The mother chip 112 also controls the operation of the daughter chips 114a . . . 114f. The mother chip 112 will also further amplify the signal read by the heads 40a . . . 40f. The mother chip 112 is preferably mounted on the flex circuit board 42, which is mounted to the side of most of the rigid arms 12. The flex circuit board 42 should be large enough for the mother chip 112 to be mounted to it, the mother chip can be any size between 4 and 8 square mm. When number of discs 18a . . . 18c in the disc drive is large and the height of the actuator arm assembly 116 is larger than the height of the mother chip, the mother chip is mounted to only some of the sides of the rigid arms 12, otherwise it is mounted to the sides of all of the rigid arms 12a . . . 12d through the flex circuit board 42. The mother chip can also be mounted on the floor of the drive 100 near the HSA. The mother chip 112 is typically connected to the daughter chips 114a . . . 114f by the micro flex circuit. The wire can be fasted by any means such as by welding, or the wires can also be etched into the suspension 30 and the rigid arm 12.

Figure 7:
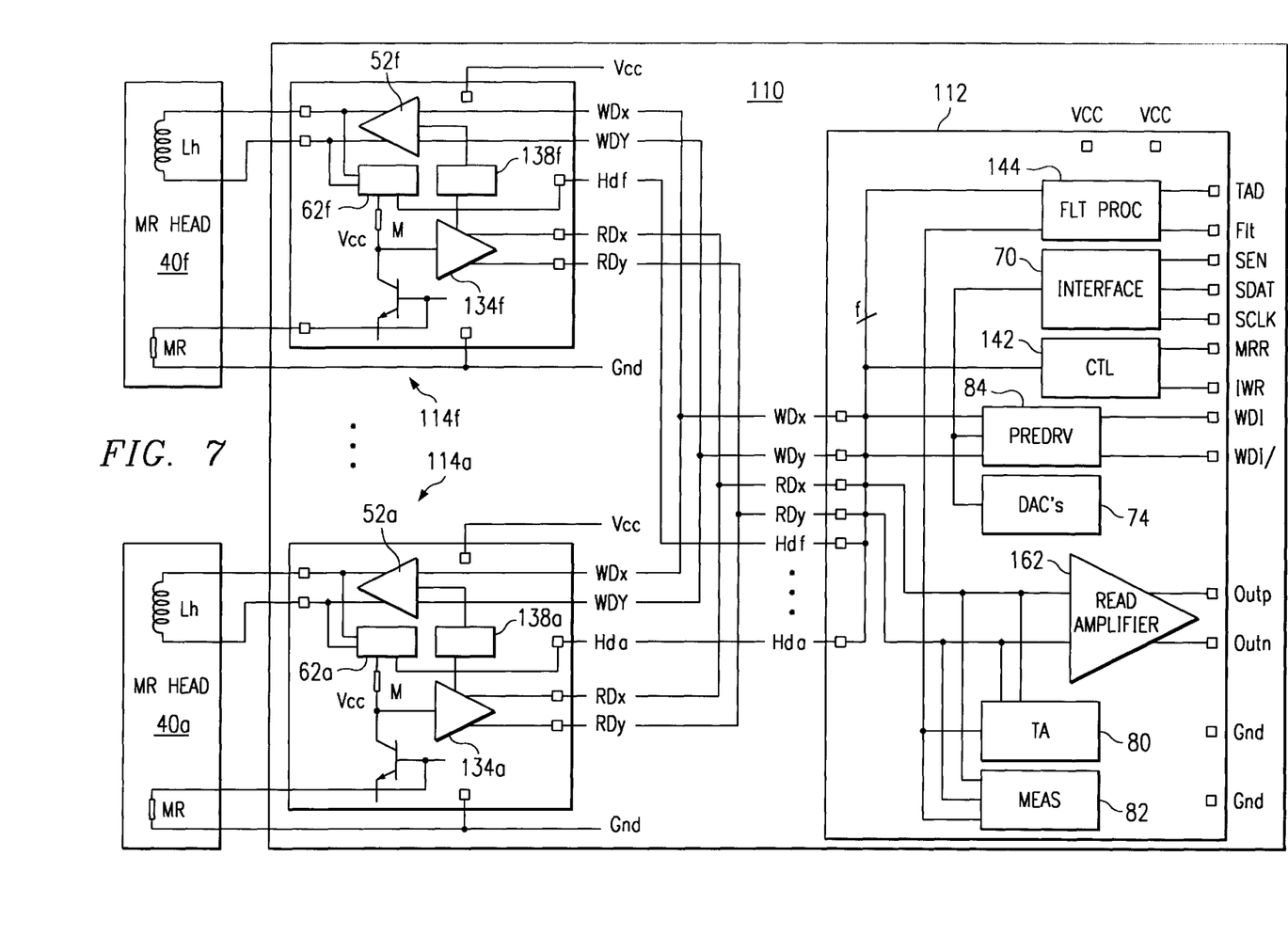
FIG. 7 is a block diagram of a portion of a disc drive according to the present invention.

FIG. 7 is a block diagram of a portion of a modified conventional disc drive 100 showing the preamplifier 110. The disc drive 100 contains the MR heads 40a . . . 40f connected to the preamplifier 110. Each head 40a . . . 40f is positioned near a disc. As explained above, the disc drive 110 usually has a head both above and below, not shown, each disc. The preamplifier 110 is split into a mother chip 112 and a plurality of daughter chips 114a . . . 114f.

Each of the daughter chips contains a write driver 52a . . . 52f for writing to the disc, a first read amplifier 134a . . . 134f for reading from the disc, a first fault detection circuit 62a . . . 62f and a bias control circuit 138a . . . 138f. The first read amplifier 134a . . . 134f also performs the first stage of amplification of the signal read by the head 40a . . . 40f. The first fault detection circuit 62a . . . 62a is preferably a write fault detection circuit for detecting write faults. The bias control circuit 138a . . . 138a controls the mode of the preamplifier. Although any bias control circuit 138a . . . 138f can be used, the preferred circuit is described pending U.S. patent applications entitled: "A Control Biased mode Control Circuit" by Axel Alegre de la Soujeole Ser. No. 08/961, 905, (Attorney Docket Number 97-087), now U.S. Pat. No. 5,977,817, incorporated herein by this reference. The daughter chips 114a . . . 114f can contain additional circuitry, however the addition of any circuitry should be balanced with the desire to keep the daughter chips 114a . . . 114f as small and light as possible to be able to place the daughter chips 114a . . . 114f as close to the head as possible. Preferably, only as much circuitry is placed on the daughter chips 114a . . . 114f as needed to make sure that signal read is amplified for further transmission, that the signal to be written is strong when it reaches the head and is being written correctly, and that daughter chip can bias the head into the read and write modes. The rest of the circuitry needed in the preamplifier 110 is preferably placed in the mother chip 112.

The mother chip contains logic, such as the control circuit 142 that controls the operation of preamplifier 110, a second read amplifier 162 to further amplify the signal from the heads, a second fault detection circuit 144, the read fault detection circuit 64. Additionally, similar to conventional preamplifiers, the mother chip 112 typically also contains a MUX and DEMUX circuits (not shown), a serial interface controller 70, a predriver 84 that typically contains a write current control and a write amplifier, a bandgap circuit (not shown), a voltage detection circuit (not shown), circuits to obtain thermal 80 and current measurements 82 of the MR transducer, and typically several D/A converters 74. The preamplifier 110 may also include various other circuitry (not shown).

In operation, the mother chip 112 determines operating state of the disc drive, i.e. whether it will perform a read or write operation, and which head and associated daughter chip will perform the operation. This is typically done by the control circuit 142. The result is passed to the MUX and DEMUX circuits, which activate the appropriate daughter chip 114a . . . 114f. The daughter chip directs its associated head to perform the operation and the result is passed back to the daughter chip, which performs initial processing on it passes it to the mother chip 112 for further processing.

A preamplifier split into a mother chip and a plurality of daughter chips allows a part of the circuitry of the preamplifier to be placed very close to the head. The daughter chip is placed very close to the head, typically on the suspension. While the suspension could not support the entire preamplifier due to the size and shape of the preamplifier, it can support this small portion of it. The daughter chip can contain very little circuitry, only what is needed to make sure the signal sent to and received from the head is strong enough not to be corrupted during transmission to the circuitry in the rest of the preamplifier. The mother chip contains the remaining circuitry needed in the preamplifier and can be placed further away on a portion of the HSA that can support a larger chip. This permits an increase in the bandwidth of the signal written without adding a significant amount of weight to the suspension. Placing a portion of the preamplifier as close to the heads as possible reduces the inductance between the head and the preamplifier, since the length of the wire is shorter. Reducing the inductance allows for an increase in frequency, producing an increase in the bandwidth, during a write operation, thus increasing the maximum data rate and capacity. It also reduces the power consumption during a write operation.

Although the invention has been specifically described with reference to several preferred and alternative embodiments, it will be understood by those skilled in the art having reference to the current specification and drawings that various modifications may be made and further alternatives are possible without departing from the spirit and scope of the invention as set forth in the appended claims.

I claim:

1. A disk drive assembly having a preamplifier for controlling the operation of and amplifying a signal from one or more heads, including a first head having a height, for performing read operations from a storage medium and write operations to the storage medium, comprising:
    a first rigid support arm;
    a first suspension coupled to the first rigid support arm, the first suspension having the first head coupled to one end thereof;
    a first daughter chip mounted on the first suspension and coupled to the first head for signaling the first head to write data to and to read data from the storage medium and for amplifying the signal from the first head;
    a mother chip spaced from the first suspension and coupled to the first daughter chip for controlling the operation of the daughter chip, further amplifying the data read by the first head.

2. The preamplifier of claim 1, wherein the first head is a magneto-resistive head.

3. The preamplifier of claim 1, wherein the first daughter chip has a height less than about 300μ.

4. The preamplifier of claim 1, wherein the first daughter chip is mounted on the first suspension by a solder bump having a thickness.

5. The preamplifier of claim 4, wherein the thickness of the solder bump is less than about 100μ.

6. The preamplifier of claim 4, wherein the first daughter chip has a height approximately equal to the height of the first head less the thickness of the solder bump.

7. The preamplifier of claim 1, wherein the first daughter chip is mounted on the first suspension between about 3 and 17 millimeters from the first head.

8. The preamplifier of claim 1, wherein the first daughter chip is coupled to the first head by wires etched into the first suspension.

9. The preamplifier of claim 1, wherein the mother chip is mounted to the side of the rigid arm.

10. The preamplifier of claim 1, wherein the actuator arm further includes:
    second suspension coupled to a second head and attached to the rigid arm; and
    a second daughter chip for signaling the second head to write data to and to read data from the storage medium and for amplifying the signal from the second head, the second daughter chip mounted on the second suspension and electrically coupled to the mother chip.

11. The preamplifier of claim 1, wherein the first daughter chip further comprises:
    a write driver for writing to the storage medium;
    a first read amplifier for reading from the storage medium and amplifying the signal read from the storage medium;
    a first fault detection circuit for detecting write faults; and
    a bias control circuit for controlling the mode of the preamplifier and magnitude of read and write currents.

12. The preamplifier of claim 1, wherein the first suspension has a first side facing the storage medium and the first head and first daughter chip are mounted on the first side.

13. A preamplifier for controlling the operation of and amplifying a signal from a plurality of heads having a height, for performing read operations from and write operations to a storage medium, the preamplifier mounted on a plurality of actuator arms each having a rigid arm having a side, and at least one suspension coupled to one of the plurality of heads, each suspension attached to one rigid arm, the preamplifier comprising:
    a plurality of daughter chips each coupled to one of the plurality of heads for signaling the associated head to write data to and to read data from the storage medium and for amplifying the signal read by the associated head, each daughter chip mounted on one of the plurality of suspensions; and,
    a mother chip coupled to the daughter chips for selecting one of the plurality of daughter chips to signal the associated head to write data to or read data from the storage medium, controlling the operation of the plurality of daughter chips, further amplifying the data read by the heads, and fault management.

14. The preamplifier of claim 13, wherein each of the plurality of heads is a magneto-resistive head.

15. The preamplifier of claim 13, wherein each of the plurality of daughter chips has a height less than about 300μ.

16. The preamplifier of claim 13, wherein each of the plurality of daughter chips is mounted on the associated suspension by a solder bump having a thickness.

17. The preamplifier of claim 16, wherein the thickness of the solder bump is less than about 100μ.

18. The preamplifier of claim 16, wherein each of the plurality of daughter chips has a height approximately equal to the height of the associated head less the thickness of the solder bump.

19. The preamplifier of claim 13, wherein each of the plurality of daughter chips is mounted on the associated suspension between about 3 and 17 millimeters from the associated head.

20. The preamplifier of claim 13, wherein each of the plurality of daughter chips is coupled to the associated head by wires etched into the associated suspension.

21. The preamplifier of claim 13, wherein the mother chip is mounted to the side of at least one of the rigid arms.

22. The preamplifier of claim 13, wherein the daughter chip further comprises:
   a write driver for writing to the storage medium;
   a first read amplifier for reading from the storage medium and amplifying the signal read from the storage medium;
   a first fault detection circuit for detecting write faults; and
   a bias control circuit for controlling the mode of the preamplifier and magnitude of read and write currents.

23. The preamplifier of claim 13, wherein each suspension has a first side facing the storage medium and first side having one of the heads and one of the daughter chip mounted on the first side.

24. A preamplifier for controlling the operation of and amplifying a signal from one or more heads, including a first head having a height, for performing read operations from a storage medium and write operations to the storage medium, the preamplifier comprising:
   a first daughter chip coupled to the first head for signaling the first head to write data to and to read data from the storage medium and for amplifying the signal read by the first head, the first daughter chip including:
      a write driver for writing to the storage medium;
      a first read amplifier for reading from the storage medium and amplifying the signal read from the storage medium;
      a first fault detection circuit for detecting write faults; and
      a bias control circuit for controlling the mode of the preamplifier and magnitude of read and write currents; and
   a mother chip coupled to the daughter chip for controlling the operation of the daughter chip, further amplifying the data read by the first head, and fault management, the mother chip including:
      a control circuit for determining the mode of the preamplifier; and
      a second read amplifier for further amplifying the signal read from the storage medium.

25. The preamplifier of claim 24, wherein the mother chip further comprises:
   a digital to analog converter;
   a voltage detection circuit for measuring voltage and changes in voltage detected by the first head during the read operation; and
   a current measuring circuit for measuring current and changes in current detected by the first head during the read operation.

26. The preamplifier of claim 24, wherein the first head is a magneto-resistive head.

27. The preamplifier of claim 24, wherein the first daughter chip has a height less than about 300μ.

28. The preamplifier of claim 24, wherein:
   the preamplifier is mounted on an actuator arm having a rigid arm and a first suspension coupled to the first head having a height, the first suspension attached to the rigid arm;
   the first daughter chip is mounted on the first suspension, for placing the first daughter chip close to the first head; and,
   the mother chip is mounted to the side of the rigid arm.

29. The preamplifier of claim 28, wherein the first daughter chip is mounted on the first suspension by a solder bump having a thickness.

30. The preamplifier of claim 29, wherein the thickness of the solder bump is less than about 100μ.

31. The preamplifier of claim 29, wherein the first daughter chip has a height approximately equal to the height of the first head less the thickness of the solder bump.

32. The preamplifier of claim 28, wherein the first daughter chip is mounted on the first suspension between about 3 and 17 millimeters from the first head.

33. The preamplifier of claim 28, wherein the first daughter chip is coupled to the first head by wires etched into the first suspension.

34. The preamplifier of claim 28, wherein the actuator arm further includes a second suspension coupled to a second head, the second suspension attached to the rigid arm, further comprising:
   a second daughter chip for signaling the second head to write data to and to read data from the storage medium and for amplifying the signal read by the second head, the second daughter chip mounted on the second suspension and coupled to the mother chip.

35. The preamplifier of claim 28, wherein the first suspension has a first side facing the storage medium and the first head and first daughter chip are mounted on the first side.

36. A disc drive comprising:
   a plurality of heads for performing read operations from a storage medium and write operations to the storage medium, each head having a height;
   a plurality of actuator arms each having:
      a rigid arm; and
      at least one suspension coupled to one of the plurality of heads, each suspension attached to the rigid arm;
   a preamplifier for controlling the operation of and amplifying the signal from the plurality of heads, the preamplifier comprising:
      a plurality of daughter chips each coupled to one of the plurality of heads for signaling the associated head to write data to and to read data from the storage medium and for amplifying the signal read by the associated head, each daughter chip mounted on one of the plurality of suspensions for placing each of the daughter chip close to the associated head; and,
      a mother chip coupled to the daughter chips for selecting one of the plurality of daughter chips to signal the associated head to write data to or read data from the storage medium, controlling the operation of the plurality of daughter chips, further amplifying the data read by the heads, and fault management.

37. The disc drive of claim 36, wherein each of the plurality of heads is a magneto-resistive head.

38. The disc drive of claim 36, wherein each of the plurality of daughter chips has a height less than about 300μ.

39. The disc drive of claim 36, wherein each of the plurality of daughter chips is mounted on one of the first suspension by a solder bump having a thickness.

40. The disc drive of claim 39, wherein the thickness of the solder bump is less than about 100μ.

41. The disc drive of claim 39, wherein the each of the plurality of daughter chips has a height approximately equal to the height of the associated head less the thickness of the solder bump.

42. The disc drive of claim 36, wherein each of the plurality of daughter chips is mounted on the associated suspension between about 3 and 17 millimeters from the associated head.

43. The disc drive of claim 36, further comprising a plurality of wires etched into each of the suspensions each wire coupled to one the plurality of daughter chips and one the plurality of heads.

44. The disc drive of claim 36, wherein the mother chip is mounted to the side of some of the rigid arms.

45. The disc drive of claim 36, wherein the daughter chip further comprises:

a write driver for writing to the storage medium;

a front end of a read amplifier for reading from the storage medium and amplifying the signal read from the storage medium;

a first fault detection circuit for detecting write faults; and a bias control circuit for controlling the mode of the preamplifier and magnitude of read and write currents.

46. The disc drive of claim 36, wherein the mother chip further comprises:

a control circuit for determining the mode of the preamplifier;

a second read amplifier for further amplifying the signal read from the storage medium;

a digital to analog converter;

a voltage detection circuit for measuring voltage and changes in voltage detected by the heads during the read operation;

a current measuring circuit for measuring current and changes in current detected by the heads during the read operation.

47. The preamplifier of claim 36, wherein each suspension has a first side facing the storage medium and first side having one of the heads and one of the daughter chip mounted on the first side.

* * * * *